United States Patent
Koskelainen et al.

(10) Patent No.: US 8,880,639 B2
(45) Date of Patent: *Nov. 4, 2014

(54) METHOD AND SYSTEM FOR PROVISIONING SERVICES TO A TERMINAL

(75) Inventors: Petri Koskelainen, New York, NY (US); Janne Kari, Helsinki (FI); Srinivas Sreemanthula, Flower Mound, TX (US); Curt Wong, Plano, TX (US); Stefano Faccin, Dallas, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 1548 days.

This patent is subject to a terminal disclaimer.

(21) Appl. No.: 10/079,426

(22) Filed: Feb. 22, 2002

(65) Prior Publication Data

US 2003/0163545 A1     Aug. 28, 2003

(51) Int. Cl.
| | |
|---|---|
| *G06F 15/167* | (2006.01) |
| *H04L 29/08* | (2006.01) |
| *H04M 3/42* | (2006.01) |
| *H04W 48/18* | (2009.01) |
| *H04M 7/00* | (2006.01) |

(52) U.S. Cl.
CPC ............ *H04L 67/16* (2013.01); *H04L 67/2819* (2013.01); *H04M 7/006* (2013.01); *H04M 3/42153* (2013.01); *H04W 48/18* (2013.01)
USPC ............ 709/217; 709/202; 709/226; 709/229

(58) Field of Classification Search
CPC ...... H04L 65/1006; H04L 47/10; H04L 67/16
USPC ........................................ 709/217, 226, 229
See application file for complete search history.

(56) References Cited

U.S. PATENT DOCUMENTS

| 6,687,356 B1 * | 2/2004 | Glitho et al. ............. 379/201.12 |
| 6,697,806 B1 * | 2/2004 | Cook ............................... 707/10 |
| 6,775,273 B1 * | 8/2004 | Kung et al. .................... 370/356 |
| 6,788,939 B2 * | 9/2004 | Truong et al. .............. 455/435.1 |

(Continued)

FOREIGN PATENT DOCUMENTS

| WO | 9836542 | 8/1998 |
| WO | 0079741 | 12/2000 |

OTHER PUBLICATIONS

Faccin, et al.; "Service Architecture for Next Generation Networks". "Internet Protocol Based Service Architecture".

*Primary Examiner* — Nicholas Taylor

(74) *Attorney, Agent, or Firm* — Squire Patton Boggs (US) LLP

(57) ABSTRACT

The present invention is a method for provisioning services to a terminal (UE), which performs communication via at least one communication network (NW1, NW2), each network being equipped with at least one service processing entity (NW1_PE1, NW1_PE2, NW2_PE1, NW2_PE2). The method comprises the steps of: requesting, by the terminal, a specified service to be at the disposition of the requesting terminal, analyzing the request by an analyzing entity associated with the at least one communication network, deciding, by the analyzing entity, that the requested specified service is associated to a specific one of the communication networks, and in response to the decision, routing communication messages associated with the terminal via the analyzing entity to the specified service processing entity within the specified communication network.

26 Claims, 3 Drawing Sheets

(56) References Cited

U.S. PATENT DOCUMENTS

| | | | |
|---|---|---|---|
| 6,804,720 B1* | 10/2004 | Vilander et al. | 709/229 |
| 2002/0188744 A1* | 12/2002 | Mani | 709/231 |
| 2003/0005132 A1* | 1/2003 | Nguyen et al. | 709/229 |
| 2003/0041146 A1* | 2/2003 | Davis et al. | 709/227 |
| 2003/0212800 A1* | 11/2003 | Jones et al. | 709/228 |
| 2004/0003046 A1* | 1/2004 | Grabelsky et al. | 709/206 |

* cited by examiner

METHOD AND SYSTEM FOR PROVISIONING SERVICES TO A TERMINAL

BACKGROUND OF THE INVENTION

1. Field of the Invention

The present invention relates to a method and system for provisioning services to a terminal, and in particular to such a method system for provisioning services to a terminal in communication networks.

2. Description of the Prior Art

With recent progress in communication technology there is a tendency that communication systems develop an increasing complexity. Namely, with the increase in the number of different communication networks, either based on different technologies or run by different operators, there arises a need to enable a user of a terminal to use access this variety of networks and services provisioned thereby. (Note that a user is represented by its terminal, so that services provisioned for a terminal actually are provisioned to the user, while however without a terminal those services could not be provisioned to a user.)

An approach for this has been conceived by some of the inventors of the present application and described in the conference contribution, "Service Architecture For Next Generation Networks", IEEE Intelligent Network 2001 Workshop, May 6-9, Marriott Copley Place, Boston Mass., USA, session E.2.4 on Wednesday, May 9, 2001. (A corresponding U.S. patent application Ser. No. 09/792,499, was filed on Feb. 23, 2001).

Current network developments generally tend to adopt the Internet Protocol IP and applications run "on top" of IP. For example, SIP (Session Initiation Protocol) or WAP (Wireless Application Protocol) or HTTP (HyperText Transfer Protocol) are operated, "on top" of IP when referring to the protocol stack. For subsequent discussions, however, a focus is made on SIP, while it is to be noted that other protocols may also be used in connection with the present invention.

Due to the increase in the number of network types and a desired interoperability there between, compatibility of the terminals with the networks, as well as due to the increase in the number of network operators, communication network systems are likely to adopt a structure in which several networks are over-laid on each other or, stated in other words, they exist in parallel. That is, for example, several network types such as landline networks such as PSTN, IP-LAN, WAN as well as wireless communication networks such as GSM, GPRS, UMTS, CDMA2000, WLAN, BLUETOOTH and even those to be developed in future may co-exist and offer different services to a user (subscriber) represented by the user's terminal and offer the communication technology that the user may access. Also, not only a single one of such networks of a specific type may exist in parallel but also several networks of the same type may exist in parallel and run by different operators or network service providers (e.g. in Germany, D1 and D2 GSM networks are run by different operators).

Also, with the increase in provisioning services by using e.g. SIP (or WAP or others), across different communication networks constituting a communication network system and/ or even within a single communication network there may be plural service processing entities for processing/providing the services requested by/subscribed to by the user of a terminal.

The subscriber may configure several service profiles into the network and choose one of his/her preferences with the service requests based on time, geographic or network location, user (corporate, personal, spouse, children) and/or terminal device. Another interesting dimension with terminal devices is the variety of terminal devices, their capabilities and also the constant evolution of terminal capabilities. The capabilities of the terminal are also a determining factor in the service provisioning. For instance, even though a subscriber can use video services, he/she cannot use those services unless the terminal can support such features. The network must be aware of the user preferences at any time and terminal device capabilities for intelligent service provisioning.

A popular and developing trend in the current network architectures is to adopt a layered approach by abstracting different access networks. This is mainly to accommodate different access technologies and still to be able to provide application services transparently over all of these technologies. The network components providing user application services (service control components) must be aware of the terminal capabilities, subscription limitations and access mechanisms that the user may be using at any given time. Under such circumstances, however, routing of service requests is no longer "straight forward" and might even become ambiguous, which may cause problems that a requested service might even not become available at all due to routing problems. However, even if solving such routing problems by fixedly assigning a service processing entity per user/terminal, this will lower flexibility for the user in using the variety of services offered within the communication network and/or network system.

SUMMARY OF THE INVENTION

Consequently, the present invention provides an improved method and system for provisioning services to a terminal, which is free from the above-mentioned inconveniences.

According to the present invention, a method provisions services to a terminal, which terminal is adapted to perform communication via at least one communication network, each network being equipped with at least one service processing entity, the method comprising the steps of: requesting, by the terminal, a specified service to be at the disposition of the requesting terminal, analyzing the request by an analyzing entity associated with the at least one communication network, deciding, by the analyzing entity, that the requested specified service is associated to a specific one of the service processing entities of a specific one of the communication networks, and in response to the decision, routing communication messages associated with the terminal via the analyzing entity to the specified service processing entity within the specified communication network.

Also, the present invention is a system for provisioning services to a terminal, which terminal is adapted to perform communication via at least one communication network, each network being equipped with at least one service processing entity, the system comprising: requesting means, at the terminal, adapted to request a specified service to be at the disposition of the requesting terminal, an analyzing entity associated with the at least one communication network and adapted to analyze the request, deciding means, at the analyzing entity, adapted to decide that the requested specified service is associated to a specific one of the service processing entities of a specific one of the communication networks, and routing means, adapted to route responsive to the decision communication messages associated with the terminal via the analyzing entity to the specified service processing entity within the specified communication network.

According to favorable further developments of the method and/or system requesting the specified service comprises indicating the specified service in a request (registration or a service related) message, the specified service is indicated by a service identifier carried in the request message, the identifier is carried in the user data payload in the request message, the identifier is carried in a header of the request message, the identifier is piggybacked to the header, the request message comprises at least a subscriber identifier, the method further comprises the steps of detecting that the request message does not comprise a service identifier, and in response thereto, retrieving the service identifier based on the subscriber identifier from a database entity, the service identifier comprises a network code and/or a service code, the network code represents a respective one of the communication networks, the service code represents a respective one of the services to be processed at the corresponding service processing entity, the communication networks are distinguishable by at least one of the network type and/or the network operator, the services are distinguishable by at least one of the terminal type, subscriber identifier, subscriber profiles, manufacturer of the terminal, capabilities of the terminal or vendor of the terminal, and the request message is transported using the Session Initiation Protocol SIP.

The service code can indicate the activation of a specific one of the services and/or profiles that the user had previously created and configured into the network as part of the user's subscription or by network policies. Note that a specified service is intended also to mean a specified service profile (which could be considered as a set of individual, "basic" services).

By virtue of the present invention, basically the following advantages can be achieved:

By provisioning the analyzing entity which is configured and adapted to detect and recognize information contained in service requests, service requests can be handled according to the information contained therein. The information contained in the service request can be carried in e.g. a header of an existing protocol such as SIP or others, but may easily be adopted for new protocols, too.

The present invention offers the flexibility for end users to chose any service provider (and/or network) on a registration basis or a service (call) initiation basis. This flexibility is very important in the presence of multiple operators or service providers. It also offers flexibility for service providers to offer specific services to selected groups of subscribers.

Further, it also provides for easier service creation: New services can be created within a service provider's network and by the use of a specific service identifier used by the application or service on the end users terminal, the service can be handled or controlled as per the new service definition.

Also, the invention provides an ability for the end users or terminal devices to indicate, together with a service request, a service identity during registration and/or during service initiation so that a particular service provider indicated by the service identity with the request can control calls or services for the user. The invention also includes the capability within the network and/or network system to understand (e.g. implemented in the analyzing entity) the service identifiers carried with the service requests and is thus able to route the service requests to the appropriate service provider or a network node handling the service, i.e. to an appropriate service processing entity SPE.

It is also possible to use the same service identifier concept within the network by maintaining a mapping in a database between subscriber identifier and the service identifier(s). In this case, the user does not need to provide the service identifier but the network (i.e. a network entity such as the analyzing entity) shall fetch the service identifier information from the database based on the subscriber identifier and in response to the fetching routes the call accordingly. This mapping can be established off line at the time of subscription or administration.

By the use of the service identity indicated with the request, the end users are able to tell the network where and how the call or service must be handled.

The invention introduces a new network element and/or functionality referred to as analyzing entity (sometimes e.g. named "SIP Service Broker" when SIP is concerned), which decides where to route SIP requests, based on the provider or vendor information carried with SIP headers of the service requests. This allows e.g. terminals to execute specific service logic in operator network instead of standard service logic. Stated in other words, value added services can be provided by the manufacturer of the terminals to their terminals (or terminal types), and network equipment manufacturers are enabled to provide network operators with correspondingly configured service processing entities (also referred to as SIP service machinery in case SIP is concerned). Hence, different service platforms may be used inside one operator network dependent on the information carried with the service request.

Also, the present invention is not restricted to a specific architecture, while it is advantageously applicable to the IP service architecture (IPSA) as proposed e.g. in the above referenced conference contribution and corresponding U.S. patent application.

BRIEF DESCRIPTION OF THE DRAWINGS

In the following, the present invention will be described in greater detail with reference to the accompanying drawings, in which.

DETAILED DESCRIPTION OF THE PREFERRED EMBODIMENTS

Figure 1:
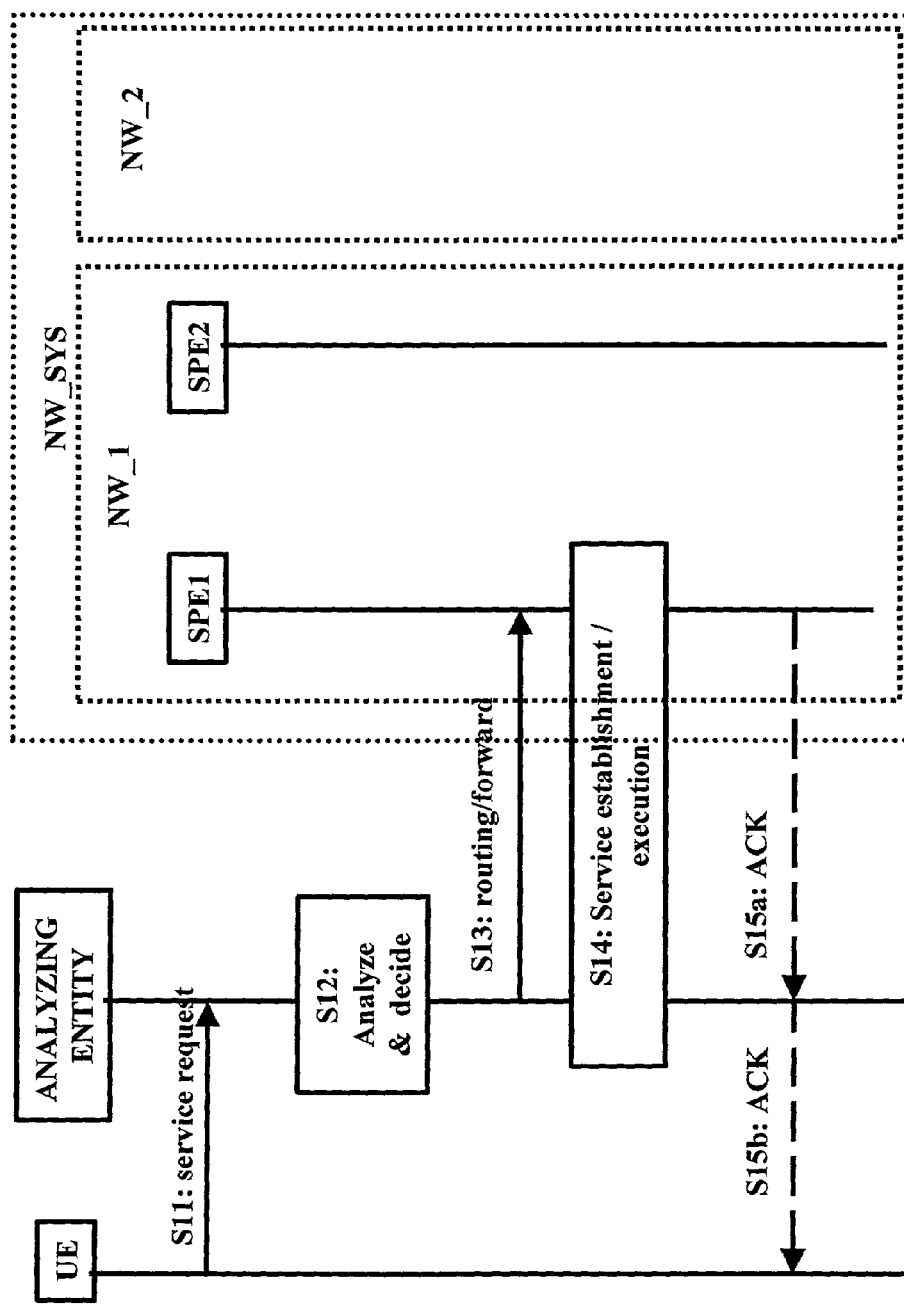
FIG. 1 shows a signaling scenario of a service request procedure according to the present invention.

Throughout the figures, the terminal is denoted by UE. The terminal may be a wireless and/or wirebound terminal adapted to communicate with at least one communication network. Communication networks are denoted by NW_1, NW_2 in the figures. In order to keep the illustration simple, the number of networks has been limited to two, while this does not represent any limitation on the invention itself. The entirety of networks forms a network system denoted by NW_SYS. Each network comprises at least one service processing entity SPE1, SPE2. In order to keep the illustration simple, the number of service processing entities has been limited to two, while this does not represent any limitation on the invention itself. Also, for network NW_2, no SPE at all is indicated in the drawings in order to further simply the representation. Nevertheless, it has to be understood that also NW_2 is equipped with at least one SPE. In case of exemplifying the present invention with reference to SIP, a service processing entity SPE may be constituted by what is known as, "SIP machinery" or SIP server.

In the figures, entities involved are illustrated in horizontal direction with the arrows therebetween representing messages/signaling exchanged therebetween. Note that the vertical arrangement of arrows represents the sequence of messages/signaling in the time domain.

Now, with reference to FIG. 1, FIG. 1 shows a signaling scenario of a service request procedure according to the present invention. The user and/or the user equipment initiates a service by issuing a service request, step S11.

The service request, S11, is forwarded to an analyzing entity associated with at least one of the communication networks NW_1, NW_2, and/or with the communication network system NW_SYS. The analyzing entity, although shown as a separate entity, may be part of an entity of the network NW_1 or NW2. Note that also more than one analyzing entity may be present. The request is forwarded to a local analyzing entity, e.g. to the one closest to the current position of the user equipment. Nevertheless, the request may also be forwarded to a predetermined analyzing entity, e.g. a "responsible" analyzing entity may be predetermined for a plurality of user equipments dependent on the user equipment identities. For example, the analyzing entity can be implemented in connection with a SIP proxy server. By means of such a request, the terminal/user equipment requests a specified service (or service profile) to be at the disposition of the terminal having issued the request.

In case of SIP as an example for a user protocol, the request may be a SIP INVITE message. In the header portion of the message, at least the subscriber (user equipment) identity is indicated in the SIP field labeled, "contact". Furthermore, a header portion (e.g. labeled, "service header") including a service identifier may be present. The service identifier comprises a network code and a service code.

The network code represents one of the communication networks NW_1, NW_2 or the like. Note that NW_1, NW_2 may be different network types, e.g. LAN or UMTS or the like, or may be of the same network type but e.g. run by different operators. Thus, the networks are distinguishable by at least one of the network type or the network operator.

The service code represents a respective one of the services (or service profiles identifying a set of services) to be processed at the corresponding service processing entity SPE. That is, by means of the service code, a corresponding service processing entity SPE can be identified. Services as such can be provisioned for specific terminal types (e.g. wireless or wirebound ones and/or different terminal series of a manufacturer such as NOKIA Communicator, or 82xx/62xx series), and/or specific subscribers (or subscriber groups), and/or specific manufacturers (e.g. Nokia or others) of a terminal, and/or vendors of a terminal. Thus, the services are distinguishable by at least one of the terminal type, subscriber identifier, manufacturer of the terminal or vendor of the terminal.

For example, it may be assumed that the service request is represented by:
SIP:INVITE
Contact: Little Guy<sip: user@ipt.com>
Service-Header: IPSA-ID
SDP:phone capabilities (codec, video)

Note that IPSA-ID represents an example name for a service identifier as described above. SDP represents the Session Description Protocol. Note further that at least part of the service identifier could be piggybacked to the header (Service-header) and e.g. be included in the SDP header portion, and/or in the payload portion.

Furthermore, service identifiers may be realized in a variety of ways. For example, a service identifier can be a simple alphanumeric string in the simplest case but it can also be of specific formats like the NAI (Network Address Identifier), FQDN (Fully Qualified Domain Name) or domain names based on the purpose of the service identifier used. For example:
Alphanumeric service identifier: service-id-i23
NAI service identifier: username@ipservice.aws.com
FQDN service identifier: dallas.ipservice.aws.com
Domain name service identifier: aws.com More generally, an identifier for a service which is a target service will usually be the means by which the service is known to the service provider and used to authenticate (and possibly to bill) someone attempting to use the service and/or the means by which traffic is directed to the service. Further examples of service identifiers are: IP address (for services with a fixed IP address, Account number, logon id/password, PIN number, E-mail address, or the like.

The service identifier information can be carried in any protocol (e.g. SIP, WAP) that provides a means to carry user data in the form of headers or description protocols (e.g. SDP) or by simply piggybacking the data. SIP has already capabilities to support this feature both in the form of headers and in the SDP. Moreover, HTML (HyperText Markup Language) or XML (eXtensible Markup Language) can carry this information in the form of tags.

Depending on the format of the service identifier, there are numerous ways of how the service identifiers can be mapped to network nodes (service platforms, servers) (e.g. databases, DNS, service discovery). A specific node referred to as analyzing entity (e.g. SIP proxies, web servers) in the network or network system is capable of understanding the semantics of the service identifiers and able to route or handle registration or service requests appropriately, i.e. to direct or rout them to the right service platform or the server itself. The semantics of the service identifiers is not necessarily part of this specific node but can be maintained externally in a database or other framework that is constantly updated with new or modified entries and their behavior.

Thus, with the request a specified service is indicated (which may be accomplished directly and/or expressly, or indirectly by reference to e.g. a storage location/database storing service identifiers per subscriber (which is to be described later on). The service identifier is thus carried in the request message, e.g. in a header portion thereof or piggybacked to the header portion, and/or in the payload portion (user data portion).

Upon receipt of the request, the analyzing entity in step S12 analyzes the request and decides that the requested specified service is associated to a specific one, e.g. SPE1 of the service processing entities of a specific one, e.g. NW_1 of said communication networks. In response to the decision, communication messages associated with the terminal are routed via the analyzing entity to the specified service processing entity within the specified communication network. Stated in other words, the request is first forwarded, step S13, to the selected SPE in the respective network, and upon receipt of the request at the selected SPE the requested service is established/executed, step S14, so that thereafter communication messages associated with the terminal are routed via the analyzing entity to the specified service processing entity within the specified communication network. Service establishment may further be acknowledged from the SPE1 via the analyzing entity to the requesting user equipment UE, steps S15a, S15b.

Figure 2:
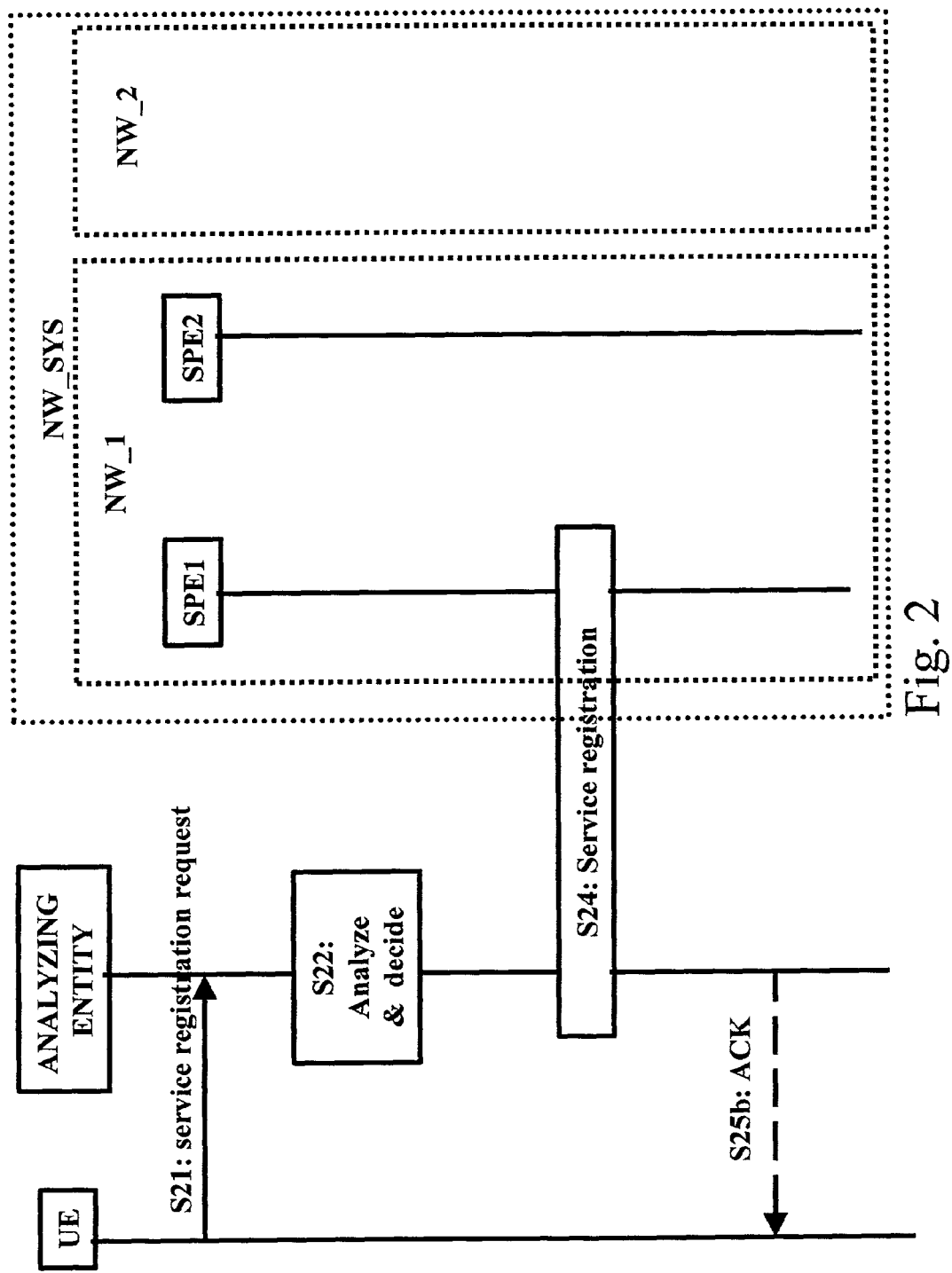
FIG. 2 shows a signaling scenario of a service registration request procedure according to the present invention.

FIG. 2 shows a signaling scenario of a service registration request procedure according to the present invention. Steps S21 to S25a are largely similar to steps S11 to S15a/S15b, with the exception that instead of a service being requested to be established/provisioned, merely the registration of the service (to be established later on upon a separate request) is requested. With reference to SIP, the request for a specific service to be at the disposition of the terminal is then represented by a SIP REGISTER request. Also, step S13 described above can be omitted in connection with the mere registration, while the remaining particularities are the same as described with reference to FIG. 1 above, including the possible variations. Also, deviating from step S14 above establishing the service, in step S24 the service is registered to the selected service processing entity, SPE1 in the illustrated example scenario.

Figure 3:
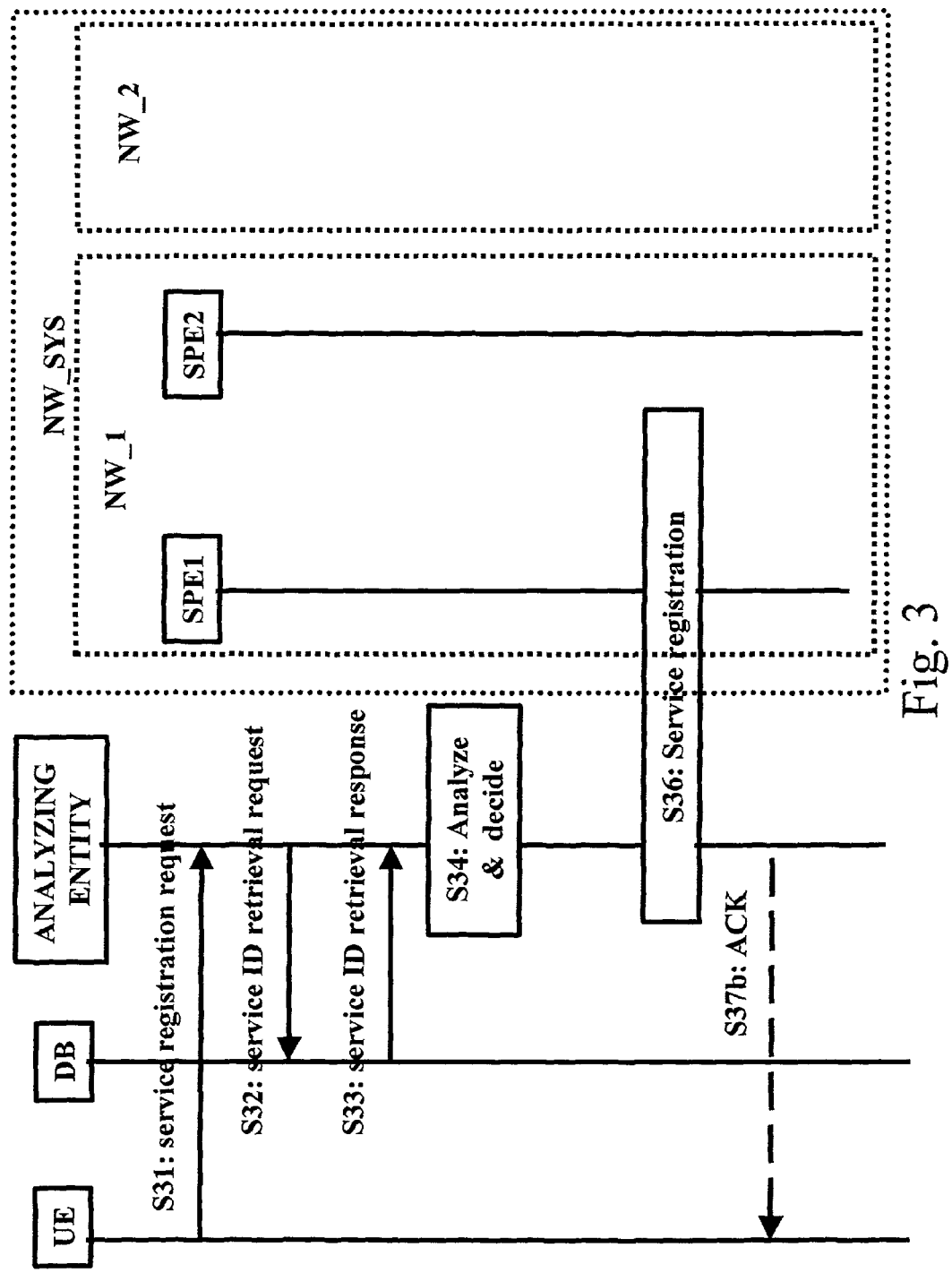
FIG. 3 shows a signaling scenario of a service registration request procedure involving a retrieval of a service identifier from a database associated to the network system, according to the present invention.

FIG. 3 shows a signaling scenario of a service registration request procedure involving a retrieval of a service identifier from a database associated to the network system, according to the present invention. The database may for example be a Home Subscriber Server HSS in a UMTS network or a Home Location Register HLR in a GSM network. Nevertheless, other subscriber databases may be used.

The procedure illustrated in FIG. 3 is largely identical to the one described with reference to the one shown in FIG. 2. In particular, the following pairs of steps correspond to each other in FIGS. 2 and 3, respectively: S21-S31, S22-S34, S24-S36, S25b-S37b. A difference resides in that in FIG. 3 additional steps S32 and S33 are illustrated.

Namely, for the description of FIG. 3 it is assumed that the request in step S31 does not include the header field "service header" and/or the information contained therein, as described above. Consequently, the service identifier is missing in the request message. This is detected by the analyzing entity upon receipt of the request. Then, in response thereto, the analyzing entity retrieves, steps S32, S33 the service identifier based on the subscriber identifier from a database entity DB. Nevertheless, retrieval can additionally be based on subscriber preferences or just on a default service identifier according to the communication network policies. The subsequent analyzing and deciding, S34, and service registration, S36, is based on the retrieved service identifier as described in connection with FIG. 2.

Even though the above description of the present invention mainly focused on the method aspects, it is to be understood that the present invention also concerns a corresponding system for provisioning services to a terminal UE, which terminal is adapted to perform communication via at least one communication network NW1, NW2, each network being equipped with at least one service processing entity SPE1, SPE2, the system comprising: requesting entity, at the terminal, adapted to request a specified service to be at the disposition of the requesting terminal, an analyzing entity associated with the at least one communication network and adapted to analyze the request, a deciding entity, at the analyzing entity, adapted to decide that the requested specified service is associated to a specific one of the service processing entities of a specific one of the communication networks, and a routing entity, adapted to route responsive to the decision communication messages associated with the terminal via the analyzing entity to the specified service processing entity within the specified communication network.

Accordingly, as has been described above, the present invention uses service identifiers of fine granulation to provide more flexibility for the network and the subscriber. The use of service identifiers may thus be as follows:

1. The user/user equipment has a capability to roam in different access networks (WLAN, UMTS, CABLE) and has one service provider and one user ID. The user can register with the network system with same user ID, but with a different service identifier (for e.g. WLAN_SERVICE_ID, UMTS_SERVICE_ID, forming part of the service identifier referred to as IPSA-ID and/or the SDP part in connection with the figures) so that a specific profile for that access network may be used. The user may have configured only specific services to be used with a certain access network, for example the user does not allow any video services over UMTS.

2. The user powers up the user equipment at home, and registers to the network system with a service identifier. Later the user arrives at the office and invokes a call, but wishes to use the corporate network. Assuming the same service provider/network operator can also provide corporate services, at the call-initiation, the user may choose "Specific Servers" to handle the call, so the call is invoked with a service-identifier, for example "CORP_SERVICE_ID". The call is first handled for service control in the provider network for the same user whose user name was identified. But, with the mention of the specific Service-ID, the analyzing entity routes the call such that it is processed differently at a selected SPE, i.e. application server(s) in this example case, to which the call is routed.

So, the invention is not limited to a any specific architecture, while however, it is particularly applicable to the IP service architecture previously suggested by the present inventors.

Due to the fact that there could be many different SIP service machinery's (possibly from different vendors) inside one operator network, a problem on how to route requests to different SIP service machineries is solved by virtue of the present invention. Also, the node responsible for routing the request (SIP message) (i.e. the analyzing entity), is adapted to analyze in these requests (e.g. SIP messages) new header portions and decide that this message should be routed differently than the others. So one aspect of the present invention concerns this SIP service Broker (analyzing entity) (this could be e.g. inside a service execution machinery SEM or it can be a separate node) which analyzes the new header in SIP message and knows how to route the message. This new header in a request such as a SIP message (service request from terminal) tells "how" this request should be handled. More precisely, this new header could tell e.g. manufacturer or vendor information. Every manufacturer would have an own identifier and this identifier would be used to forward messages. For example:

A terminal sends a service request. The service broker receives it, looks at the header and routes the request to Service Execution machinery SEM or straight to Application Execution Environment AEE. Note that expressions SEM, AEE are taken from the IP service architecture concept referred to above, and largely correspond to the Service Processing Entity SPE mentioned in this specification in terms of functionality. With such a new header, a terminal user could then get e.g. some extra services than other manufacturer's terminal users. Another example: A terminal bought from vendor A sends a service request. The Service broker receives it, looks at the header and routes the request to a specific SPE (SEM or AEE). And when the service requested is sent to the user, an advertisement about sales in vendor A shop is sent also to the user.

Accordingly, as has been described above, the present invention proposes a method for provisioning services to a terminal, which terminal is adapted to perform communication via at least one communication network, each network being equipped with at least one service processing entity, the method comprising the steps of: requesting, by the terminal, a specified service to be at the disposition of the requesting terminal, analyzing the request by an analyzing entity associated with the at least one communication network, deciding, by the analyzing entity, that the requested specified service is associated to a specific one of the service processing entities of a specific one of the communication networks, and in response to the decision, routing communication messages associated with the terminal via the analyzing entity to the specified service processing entity within the specified communication network.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

The invention claimed is:

1. A method, comprising:
receiving a request, from a terminal, for a specified service to be at a disposition of said terminal, wherein the terminal is configured to perform communication via at least one communication network, each network being equipped with service processing entities;
analyzing said request by an analyzing entity associated with said at least one communication network, said analyzing entity configured to be associable with a plurality of communication networks;
deciding, by said analyzing entity, that said requested specified service is associated with a specific one of said service processing entities of a specific one of said at least one communication network;
in response to said decision, routing communication messages associated with said terminal via said analyzing entity to said specific one of said service processing entities within said specified communication network,
wherein the requesting said specified service comprises indicating said specified service in the request,
wherein the indicating said specified service comprises carrying a service identifier in said request message;
configuring said service identifier to comprise a network code and a service code; and
configuring said service code to represent a respective one of said services to be processed at the corresponding service processing entity, such that by means of the service code, the corresponding service processing entity is identified.

2. The method according to claim 1, wherein said carrying said identifier comprises carrying the identifier in the user data payload in said request message.

3. The method according to claim 1, wherein said carrying said identifier comprises carrying the identifier in a header of said request message.

4. The method according to claim 1, further comprising: piggybacking said identifier to said header.

5. The method according to claim 1, further comprising: including at least a subscriber identifier in said request message.

6. The method according to claim 5, further comprising: detecting that said request message does not comprise a service identifier; and in response thereto, retrieving said service identifier based on said subscriber identifier from a database entity.

7. The method according to claim 6, further comprising: configuring said service identifier to comprise at least one of a network code and a service code.

8. The method according to claim 1, further comprising: configuring said network code to represent a respective one of said communication networks.

9. The method according to claim 1, further comprising: configuring said communication networks to be distinguishable by at least one of the network type and the network operator.

10. The method according to claim 1, further comprising: configuring said services to be distinguishable by at least one of the terminal type, subscriber identifier, subscriber profiles, manufacturer of the terminal, capabilities of the terminal, or vendor of the terminal.

11. A system, comprising:
a request unit, at a terminal, configured to request a specified service to be at a disposition of said terminal, wherein said terminal is configured to perform communication via at least one communication network, each network being equipped with service processing entities;
an analyzing entity associated with said at least one communication network configured to analyze said request, said analyzing entity configured to be associable with a plurality of communication networks;
a decision unit, at said analyzing entity, configured to decide that said requested specified service is associated with a specific one of said service processing entities of a specific one of said at least one communication network; and
a routing unit, responsive to said decision unit, configured to route communication messages associated with said terminal via said analyzing entity to said specific one of said service processing entities within said specified communication network,
wherein said request unit is configured to indicate said specified service in a request message,
wherein said request unit is configured to indicate said specified service by a service identifier carried in said request message,
wherein said service identifier comprises a network code and a service code, and
wherein said service code is configured to represent a respective one of said services to be processed at the corresponding service processing entity such that by means of the service code, the corresponding service processing entity is identified.

12. The system according to claim 11, wherein said identifier is configured to be carried in the user data payload in said request message.

13. The system according to claim 11, wherein said identifier is configured to be carried in a header of said request message.

14. The system according to claim 11, wherein said identifier is configured to be piggybacked to said header.

15. The system according to claim 11, wherein said request message comprises at least a subscriber identifier.

16. The system according to claim 15, further comprising:
a detection unit configured to detect that said request message does not comprise a service identifier; and
a retrieval unit configured to retrieve said subscriber identifier from a database entity.

17. The system according to claim 16, wherein said service identifier comprises at least one of a network code and a service code.

18. The system according to claim 11, wherein said network code is configured to represent a respective one of said communication networks.

19. The system according to claim 11, wherein said communication networks are configured to be distinguishable by at least one of the network type or the network operator.

20. The system according to claim 11, wherein said services are configured to be distinguishable by at least one of the terminal type, subscriber identifier, subscriber profiles, manufacturer of the terminal, capabilities of the terminal, or vendor of the terminal.

21. The method according to claim 1, wherein said request message is configured to be transported using the session initiation protocol.

22. The system according to claim 11, wherein said request message is configured to be transported using the session initiation protocol.

23. An analyzing entity, comprising:
a receiver configured to receive a request for a specified service to be at a disposition of a terminal, wherein the terminal is configured to perform communication via at least one communication network, each network being equipped with service processing entities;
a processor configured to analyze the request;
a decider configured to decide whether the requested specified service is associated with a specific one of said service processing entities of a specific one of said at least one communication network; and
a router, configured, in response to a decision of the decider, to route communication messages associated with said terminal to said specified service processing entity within said specified communication network,
wherein the analyzing entity is associated with said at least one communication network, and configured to be associable with a plurality of communication networks,
wherein said request is configured to indicate said specified service by a service identifier carried in said request, and wherein said service identifier comprises a network code and a service code, and
wherein said service code is configured to represent a respective one of said services to be processed at the corresponding service processing entity such that by means of the service code, the corresponding service processing entity is identified.

24. A terminal, comprising:
requesting means for sending a request that a specified service to be at a disposition of the terminal to an analyzing entity associated with said at least one communication network for analyzing the request, said analyzing entity configured to be associable with a plurality of communication networks and configured to decide that the specified service is associated with a specific one of the service processing entities of a specific one of the at least one communication network; and
sending means for sending messages regarding the specified service to the specific service processing entity within the specified communication network via the analyzing entity, when the request has been routed to the specific service processing entity by the analyzing entity,
wherein the terminal is configured to perform communication via at least one communication network, the network being equipped with service processing entities,
wherein said request is configured to indicate said specified service by a service identifier carried in said request, and wherein said service identifier comprises a network code and a service code, and
wherein said service code is configured to represent a respective one of said services to be processed at the corresponding service processing entity such that by means of the service code, the corresponding service processing entity is identified.

25. A system, comprising:
requesting means, at a terminal, for requesting a specified service to be at a disposition of said terminal, wherein said terminal is configured to perform communication via at least one communication network, each network being equipped with service processing entities;
an analyzing entity associated with said at least one communication network for analyzing said request, said analyzing entity configured to be associable with a plurality of communication networks;
deciding means, at said analyzing entity, for deciding that said requested specified service is associated with a specific one of said service processing entities of a specific one of said at least one communication network; and
routing means, responsive to said decision for routing communication messages associated with said terminal via said analyzing entity to said specific one of said service processing entities within said specified communication network,
wherein said request is configured to indicate said specified service by a service identifier carried in said request, and wherein said service identifier comprises a network code and a service code, and
wherein said service code is configured to represent a respective one of said services to be processed at the corresponding service processing entity such that by means of the service code, the corresponding service processing entity is identified.

26. A terminal, comprising:
a requesting entity configured to send a request that a specified service to be at a disposition of the terminal to an analyzing entity associated with said at least one communication network for analyzing the request, said analyzing entity configured to be associable with a plurality of communication networks and configured to decide that the specified service is associated with a specific one of the service processing entities of a specific one of the at least one communication network; and
a sending entity configured to send messages regarding the specified service to the specific service processing entity within the specified communication network via the analyzing entity, when the request has been routed to the specific service processing entity by the analyzing entity,
wherein the terminal is configured to perform communication via at least one communication network, the network being equipped with service processing entities,
wherein said request is configured to indicate said specified service by a service identifier carried in said request, and wherein said service identifier comprises a network code and a service code, and
wherein said service code is configured to represent a respective one of said services to be processed at the corresponding service processing entity such that by means of the service code, the corresponding service processing entity is identified.

* * * * *